(12) United States Patent
Fujiwara et al.

(10) Patent No.: US 9,908,959 B2
(45) Date of Patent: Mar. 6, 2018

(54) POLYACRYLAMIDE RESIN, PAPERMAKING ADDITIVE, AND PAPER

(71) Applicant: HARIMA CHEMICALS, INCORPORATED, Kakogawa-shi, Hyogo (JP)

(72) Inventors: Takahiro Fujiwara, Hyogo (JP); Atsushi Fukuda, Hyogo (JP)

(73) Assignee: HARIMA CHEMICALS, INCORPORATED, Hyogo (JP)

( * ) Notice: Subject to any disclaimer, the term of this patent is extended or adjusted under 35 U.S.C. 154(b) by 0 days.

(21) Appl. No.: 15/519,656

(22) PCT Filed: Oct. 14, 2016

(86) PCT No.: PCT/JP2016/080481
§ 371 (c)(1),
(2) Date: Apr. 17, 2017

(87) PCT Pub. No.: WO2017/073355
PCT Pub. Date: May 4, 2017

(65) Prior Publication Data
US 2017/0253683 A1 Sep. 7, 2017

(30) Foreign Application Priority Data
Oct. 30, 2015 (JP) ................. 2015-214877

(51) Int. Cl.
*C08F 220/56* (2006.01)

(52) U.S. Cl.
CPC ........ *C08F 220/56* (2013.01); *C08F 2800/10* (2013.01)

(58) Field of Classification Search
CPC ............. C08F 220/56; C08F 2800/10
USPC ........................................ 526/304
See application file for complete search history.

(56) References Cited

FOREIGN PATENT DOCUMENTS

| CN | 101133212 A | | 2/2008 | |
|---|---|---|---|---|
| JP | 06-212597 | * | 8/1994 | ............ C08F 222/06 |
| JP | 6-212597 A | | 8/1994 | |
| JP | 2000-273790 A | | 10/2000 | |
| JP | 2011-236532 | * | 11/2011 | ............ C08F 220/56 |
| JP | 2011-236532 A | | 11/2011 | |
| JP | 2015-040207 A | | 3/2015 | |
| WO | 2006/071853 A1 | | 7/2006 | |
| WO | WO 2014/080628 A1 | | 5/2014 | |

OTHER PUBLICATIONS

International Search Report (PCT/ISA/210) dated Dec. 6, 2016, by the Japanese Patent Office as the International Searching Authority for International Application No. PCT/JP2016/080481 (3 pages).

Written Opinion (PCT/ISA/237) dated Dec. 6, 2016, by the Japanese Patent Office as the International Searching Authority for International Application No. PCT/JP2016/080481 (3 pages).
Decision to Grant a Patent in Japanese Application No. 2016-564348 dated Nov. 28, 2016, (with English translation, 3 pages).

* cited by examiner

Primary Examiner — Ling Choi
Assistant Examiner — Chun-Cheng Wang
(74) Attorney, Agent, or Firm — Buchanan, Ingersoll & Rooney PC

(57) ABSTRACT

A polyacrylamide resin has at least one kind of a first unit represented by the following formulas (1) to (4) and a second unit represented by the following formula (5).

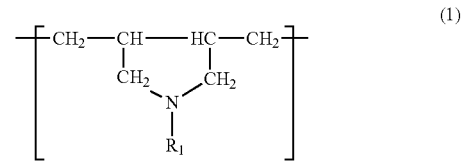

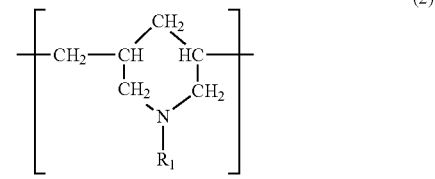

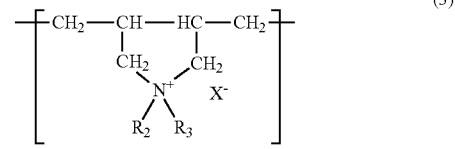

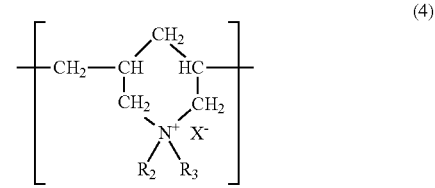

(In the above-described formulas (1) to (4), R1 represents a hydrogen atom, a methyl group, an ethyl group, or a benzyl group; R2 and R3 are independent and represent a hydrogen atom, a methyl group, an ethyl group, or a benzyl group; and X represents an anion).

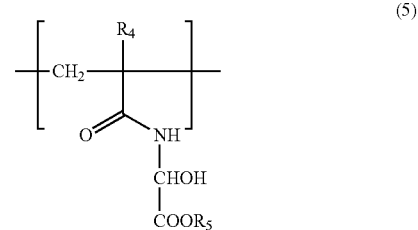

(In the above-described formula (5), R4 represents a hydrogen atom or a methyl group and R5 represents a hydrogen atom, an alkali metal ion, or an ammonium ion).

5 Claims, No Drawings

POLYACRYLAMIDE RESIN, PAPERMAKING ADDITIVE, AND PAPER

TECHNICAL FIELD

The present invention relates to a polyacrylamide resin, a papermaking additive, and paper, to be specific, to a polyacrylamide resin, a papermaking additive containing the polyacrylamide resin, and paper containing the polyacrylamide resin.

BACKGROUND ART

In the papermaking field, for example, various papermaking additives such as yield-improving agents and water filtering property-improving agents so as to improve the runnability and work efficiency by improving the yield and water filtering property of pulp and/or fillers which are/is a material, and papermaking additives so as to improve the strength of paper products have been conventionally known.

To be more specific, as such a papermaking additive, for example, an amphoteric polymer compound obtained by adding methyl diallylamine and carboxylic acid (fumaric acid) to water to be heated and dissolved to be then polymerized by adding a polymerization initiator thereto has been proposed, and the use of the amphoteric polymer compound, as a paper additive, has been also proposed (ref: Patent Document 1 (Synthetic Example 4)).

CITATION LIST

Patent Document

Patent Document 1: Japanese Unexamined Patent Publication No. H6-212597

SUMMARY OF THE INVENTION

Problem to be Solved by the Invention

Meanwhile, in the paper containing the paper additive described in Patent Document 1, the strength thereof may not be sufficient depending on the intended use. Also, in the papermaking field, further improvement of the water filtering property so as to improve the production efficiency of paper has been demanded.

It is an object of the present invention to provide a polyacrylamide resin capable of improving the strength of paper, among all, the internal bond strength of paper and improving the water filtering property; a papermaking additive containing the polyacrylamide resin; and paper containing the polyacrylamide resin.

Means for Solving the Problem

The present invention [1] includes a polyacrylamide resin having at least one kind of a first unit represented by the following formulas (1) to (4) and a second unit represented by the following formula (5).

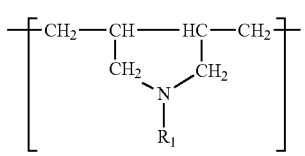

(1)

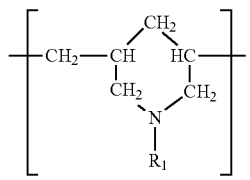

(2)

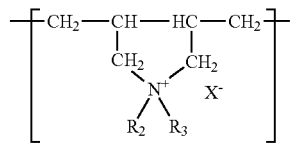

(3)

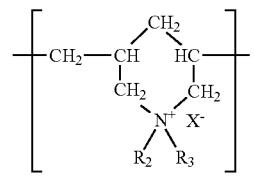

(4)

(In the above-described formulas (1) to (4), R1 represents a hydrogen atom, a methyl group, an ethyl group, or a benzyl group; R2 and R3 are independent and represent a hydrogen atom, a methyl group, an ethyl group, or a benzyl group; and X represents an anion.)

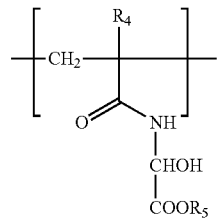

(5)

(In the above-described formula (5), R4 represents a hydrogen atom or a methyl group and R5 represents a hydrogen atom, an alkali metal ion, or an ammonium ion.)

The present invention [2] includes the polyacrylamide resin described in the above-described [1] having the first unit represented by the above-described formula (3) or the above-described formula (4) and having X representing $Cl^-$.

The present invention [3] includes a papermaking additive containing the polyacrylamide resin described in the above-described [1] or [2].

The present invention [4] includes paper containing the polyacrylamide resin described in the above-described [1] or [2].

Effect of the Invention

According to the polyacrylamide resin of the present invention and the papermaking additive containing the polyacrylamide resin of the present invention, when they are used in the production of paper, improvement of the strength of the paper, among all, the internal bond strength of the paper can be achieved and improvement of the water filtering property can be achieved.

The paper of the present invention contains the polyacrylamide resin of the present invention, so that it can be obtained with excellent productivity and has excellent strength.

DESCRIPTION OF EMBODIMENTS

A polyacrylamide resin of the present invention has at least one kind of a first unit represented by the following formulas (1) to (4) and a second unit represented by the following formula (5).

In other words, the polyacrylamide resin has at least one kind of the first unit selected from the group consisting of the following formula (1), the following formula (2), the following formula (3), and the following formula (4) and the second unit represented by the following formula (5). The first unit and the second unit are a divalent constitutional unit constituting the polyacrylamide resin.

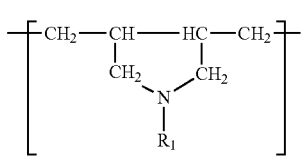
(1)

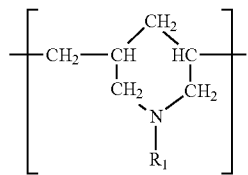
(2)

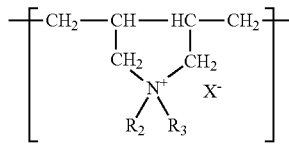
(3)

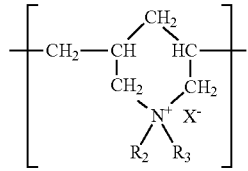
(4)

(In the above-described formulas (1) to (4), R1 represents a hydrogen atom, a methyl group, an ethyl group, or a benzyl group; R2 and R3 are independent and represent a hydrogen atom, a methyl group, an ethyl group, or a benzyl group; and X represents an anion.)

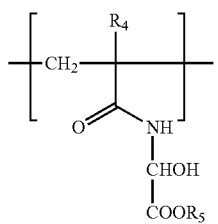
(5)

(In the above-described formula (5), R4 represents a hydrogen atom or a methyl group and R5 represents a hydrogen atom, an alkali metal ion, or an ammonium ion.)

In the above-described formulas (1) to (2), R1 represents a hydrogen atom, a methyl group, an ethyl group, or a benzyl group. As R1, preferably, a hydrogen atom and a methyl group are used, or more preferably, a methyl group is used.

When the polyacrylamide resin has a plurality of first units represented by the above-described formulas (1) to (2), these R1s may be the same or different from each other.

In the above-described formulas (3) to (4), R2 and R3 are independent and represent a hydrogen atom, a methyl group, an ethyl group, or a benzyl group. As R2 and R3, preferably, a hydrogen atom and a methyl group are used, or more preferably, a methyl group is used.

In the above-described formulas (3) to (4), X represents an anion. The anion is a counter anion with respect to the ammonium cation in the above-described formulas (3) to (4), and examples thereof include halogen anions such as chlorine anion (Cr), bromine anion (Br$^-$), and iodine anion (I$^-$) and organic anions such as methyl sulfate anion (CH$_3$O$_4$S$^-$). As X, in view of improvement of the internal bond strength of the paper and improvement of the water filtering property of the paper, preferably, a halogen anion is used, or more preferably, a chlorine anion (Cl$^-$) is used.

When the polyacrylamide resin has a plurality of first units represented by the above-described formulas (3) to (4), R2, R3, and X thereof may be the same or different from each other.

In the above-described formula (5), R4 represents a hydrogen atom or a methyl group. As R4, preferably, a hydrogen atom is used.

In the above-described formula (5), R5 represents a hydrogen atom, an alkali metal ion, or an ammonium ion (NH$_4^-$). Examples of the alkali metal ion include lithium ion (Li$^+$), sodium ion (Na$^-$), potassium ion (K$^+$), rubidium ion (Rb$^+$), and cesium ion (Cs$^+$). As the alkali metal ion, preferably, a sodium ion (Na$^-$) and a potassium ion (K$^+$) are used.

When the polyacrylamide resin has a plurality of second units represented by the above-described formula (5), R4 and R5 thereof may be the same or different from each other.

The polyacrylamide resin can be, for example, obtained as a polymer of a polymerization component containing a first polymerizable compound so as to form the first unit and a second polymerizable compound so as to form the second unit.

The first polymerizable compound is a monomer so as to form the first unit represented by the above-described formulas (1) to (4), and examples thereof include a diallylamine compound so as to form the first unit represented by the above-described formulas (1) to (2) and a diallylammonium compound so as to form the first unit represented by the above-described formulas (3) to (4).

The diallylamine compound is a compound having a secondary or tertiary amino group and two allyl groups (—CH$_2$CH=CH$_2$) directly bonded to a nitrogen atom of the amino group, and examples thereof include secondary diallylamine monomers (monomers having a secondary amino group) such as diallylamine and tertiary diallylamine monomers (monomers having a tertiary amino group) such as N-methyldiallylamine, N-ethyldiallylamine, and N-benzyldiallylamine. These diallylamine compounds can be used alone or in combination of two or more. As the diallylamine compound, preferably, a tertiary diallylamine monomer is used.

The diallylammonium compound is a compound having an ammonium group and two allyl groups ($-CH_2CH=CH_2$) directly bonded to a nitrogen atom of the ammonium group, and an example thereof includes a quaternary compound (quaternary salt) obtained by quaternizing a tertiary diallylamine monomer. Examples of the quaternary compound of the tertiary diallylamine monomer include diallyldimethylammonium chloride, diallyldimethylammonium bromide, diallyldimethylammonium iodide, diallyldimethylammonium methyl sulfate, diallyldiethylammonium chloride, diallyldiethylammonium bromide, diallyldiethylammonium iodide, diallyldiethylammonium methyl sulfate, diallylmethylethylammonium chloride, diallylmethylethylammonium bromide, diallylmethylethylammonium iodide, diallylmethylethylammonium methyl sulfate, diallylmethylbenzylammonium chloride, diallylmethylbenzylammonium bromide, diallylmethylbenzyl ammonium iodide, diallylmethylbenzylammonium methyl sulfate, diallylethylbenzylammonium chloride, diallylethylbenzylammonium bromide, diallylethylbenzylammonium iodide, diallylethylbenzylammonium methyl sulfate, diallylbenzyl ammonium chloride, diallyldibenzylammonium bromide, diallyldibenzylammonium iodide, and diallyldibenzylammonium methylsulfate. These diallylammonium compounds can be used alone or in combination of two or more.

As the first polymerizable compound, for example, inorganic acid salts such as hydrochloride, sulfate, nitrate, and phosphate of the above-described diallylamine compound and organic acid salts such as acetate of the above-described diallylamine compound can be also used.

These first polymerizable compounds can be used alone or in combination of two or more.

As the first polymerizable compound, preferably, a diallylammonium compound is used, or more preferably, diallyldimethylammonium chloride is used.

The content ratio of the first polymerizable compound with respect to the total mol number of the polymerization component is, for example, 0.01 mol % or more, or preferably 0.1 mol % or more and, for example, 30 mol % or less, or preferably 15 mol % or less.

The second polymerizable compound is a monomer so as to form the second unit represented by the above-described formula (5), and an example thereof includes a glyoxylic acid-modified product of (meth)acrylamide.

Examples of the (meth)acrylamide include acrylamide and methacrylamide. (Meth)acryl is defined as acryl and/or methacryl (hereinafter, the same).

To be specific, examples of the glyoxylic acid-modified product of the (meth)acrylamide include 2-acrylamide-N-glycolic acid, 2-methacrylamide-N-glycolic acid, and a salt thereof. Examples of the salt include sodium salt, potassium salt, and ammonium salt. These glyoxylic acid-modified products of the (meth)acrylamide can be used alone or in combination of two or more.

These second polymerizable compounds can be used alone or in combination of two or more.

As the second polymerizable compound, preferably, a glyoxylic acid-modified product of (meth)acrylamide is used, or more preferably, 2-acrylamide-N-glycolic acid is used.

The content ratio of the second polymerizable compound with respect to the total mol number of the polymerization component is, for example, 0 mol % or more, or preferably 0.1 mol % or more and, for example, 30 mol % or less, or preferably 15 mol % or less.

As described above, the content ratio of the second polymerizable compound may be 0 mol % with respect to the total mol number of the polymerization component. That is, the second polymerizable compound may not be contained in the polymerization component. In this case, as the details are described later, while or after the polymerization component is polymerized, the polymerized component is acid-modified with glyoxylic acid and/or the salt thereof, thereby forming the second unit represented by the above-described formula (5).

The polymerization component can contain another polymerizable monomer as an optional component in addition to the first polymerizable compound and the second polymerizable compound.

Examples of the other polymerizable monomer include (meth)acrylamide, an anionic polymerizable monomer (excluding the second polymerizable compound (hereinafter, the same)), a nonionic copolymerizable monomer, a tertiary amino monomer (excluding the tertiary diallylamine monomer (hereinafter, the same)), a quaternary ammonium monomer (excluding the quaternary compound of the tertiary diallylamine monomer (hereinafter, the same)), a cross-linking monomer, and (meth)allyl sulfonate.

The (meth)acrylamide is (meth)acrylamide that is not modified with the glyoxylic acid and the (meth)acrylamides can be used alone or in combination of two or more. That is, as another polymerizable monomer, either the acrylamide or the methacrylamide may be used or they may be used in combination. Preferably, the acrylamide is used alone.

When the (meth)acrylamide is contained, the content ratio thereof with respect to the total mol number of the polymerization component is, for example, 50 mol % or more, or preferably 60 mol % or more and, for example, 99 mol % or less, or preferably 97 mol % or less.

Examples of the anionic polymerizable monomer include organic acid monomers such as $\alpha,\beta$-unsaturated carboxylic acid and a sulfonic acid monomer having a vinyl group.

Examples of the $\alpha,\beta$-unsaturated carboxylic acid include $\alpha,\beta$-unsaturated monocarboxylic acid monomers such as acrylic acid, methacrylic acid, and crotonic acid and $\alpha,\beta$-unsaturated dicarboxylic acid monomers such as maleic acid, fumaric acid, itaconic acid, and citraconic acid.

Examples of the sulfonic acid monomer having a vinyl group include vinyl sulfonic acid, styrene sulfonic acid, and 2-acrylamide-2-methylpropane sulfonic acid.

As the anionic copolymerizable monomer, salts such as sodium salt, potassium salt, and ammonium salt of the above-described organic acid monomer can be also used.

These anionic polymerizable monomers can be used alone or in combination of two or more.

As the anionic polymerizable monomer, preferably, an organic monomer is used, more preferably, $\alpha,\beta$-unsaturated carboxylic acid is used, further more preferably, itaconic acid and acrylic acid are used, or particularly preferably, itaconic acid is used.

When the anionic polymerizable monomer is contained, the content ratio thereof with respect to the total mol number of the polymerization component is, for example, above 0 mol %, or preferably 0.5 mol % or more and, for example, 20 mol % or less, or preferably 10 mol % or less.

Examples of the nonionic polymerizable monomer include alkyl (meth)acrylate, hydroxyalkyl (meth)acrylate, diacetone acrylamide, styrene, $\alpha$-methylstyrene, polyalkylene glycol (meth)acrylate, glycerol mono(meth)acrylate, vinylpyrrolidone, vinyloxazoline, vinyl acetate, acryloyl morpholine, and acrylonitrile.

These nonionic polymerizable monomers can be used alone or in combination of two or more.

As the nonionic polymerizable monomer, preferably, alkyl (meth)acrylate and hydroxy alkyl (meth)acrylate are used.

An example of the alkyl (meth)acrylate includes a straight-chain, branched, or cyclic alkyl (meth)acrylate monomer having 1 to 30 carbon atoms such as methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, t-butyl (meth)acrylate, pentyl (meth)acrylate, neopentyl (meth)acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, dodecyl (meth)acrylate, tridecyl (meth)acrylate, tetradecyl (meth)acrylate, 1-methyltridecyl (meth)acrylate, hexadecyl (meth)acrylate, octadecyl (meth)acrylate (stearyl (meth)acrylate), isostearyl (meth)acrylate, eicosyl (meth)acrylate, docosyl (meth)acrylate (behenyl (meth)acrylate), tetracosyl (meth)acrylate, triacontyl (meth)acrylate, and cyclohexyl (meth)acrylate.

When the nonionic copolymerizable monomer is contained, the content ratio thereof with respect to the total mol number of the polymerization component is, for example, above 0 mol %, or preferably 1 mol % or more and, for example, 20 mol % or less, or preferably 10 mol % or less.

The tertiary amino monomer (excluding the tertiary diallylamine monomer) is a polymerizable monomer having a tertiary amino group (non-quaternary compound), and examples thereof include (meth)acrylate derivatives having a tertiary amino group and (meth)acrylamide derivatives having a tertiary amino group. Examples of the (meth)acrylate derivative having a tertiary amino group include dialkylaminoethyl (meth)acrylate (for example, dimethylaminoethyl (meth)acrylate and the like) and dialkylaminopropyl (meth)acrylate. An example of the (meth)acrylamide derivative having a tertiary amino group includes dialkylaminoalkyl (meth)acrylamide (for example, dialkylaminopropyl (meth)acrylamide (for example, dimethyl aminopropyl acrylamide and the like), (meth)acrylamide-3-methylbutyldimethylamine, and the like).

These tertiary amino monomers can be used alone or in combination of two or more.

When the tertiary amino monomer is contained, the content ratio thereof with respect to the total mol number of the polymerization component is, for example, above 0 mol %, or preferably 0.1 mol % or more and, for example, 30 mol % or less, or preferably 15 mol % or less.

The quaternary ammonium monomer (excluding the quaternary compound of the tertiary diallylamine monomer) is a cationic copolymerizable monomer having a quaternary ammonium group and having an ethylenically double bond, and an example thereof includes the quaternary compound of the above-described tertiary amino monomer.

An example of the quaternary compound of the tertiary amino monomer includes a quaternary compound (quaternary salt) obtained by quaternizing the tertiary amino group of the above-described tertiary amino monomer with methyl chloride (chloromethane), methyl bromide, benzyl chloride, benzyl bromide, dimethyl sulfate, epichlorohydrin, and the like.

These quaternary ammonium monomers can be used alone or in combination of two or more.

When the quaternary ammonium monomer is contained, the content ratio thereof with respect to the total mol number of the polymerization component is, for example, above 0 mol %, or preferably 0.1 mol % or more and, for example, 30 mol % or less, or preferably 15 mol % or less.

Examples of the cross-linking monomer include cross-linking monomers having an amide group (for example, methylenebis (meth)acrylamide, ethylenebis (meth)acrylamide, allyl (meth)acrylamide, N-substituted acrylamide monomer (for example, N,N'-dimethylacrylamide, diacetone acrylamide, and isopropyl acrylamide), and triacrylformal), cross-linking monomers having an imide group (for example, diacryloylimide and the like), nitrogen-free bifunctional cross-linking agents (for example, divinylbenzene, ethylene glycol di(meth)acrylate diethylene glycol di(meth)acrylate, triethylene glycol di(meth)acrylate, allyl (meth)acrylate, and the like), and nitrogen-free polyfunctional cross-linking agents (for example, pentaerythritol triacrylate, trimethylol propane acrylate, tetraallyloxyethane, and the like).

These cross-linking monomers can be used alone or in combination of two or more.

When the cross-linking monomer is contained, the content ratio thereof with respect to the total mol number of the polymerization component is, for example, above 0 mol %, or preferably 0.01 mol % or more and, for example, 10 mol % or less, or preferably 5 mol % or less.

The (meth)allyl sulfonate is a copolymerizable monomer that also functions as a chain transfer agent. (Meth)allyl is defined as allyl and/or methallyl.

To be specific, examples of the (meth)allyl sulfonate include sodium allylsulfonate, sodium methallylsulfonate, potassium allylsulfonate, and potassium methallylsulfonate.

These (meth)allyl sulfonates can be used alone or in combination of two or more.

When the (meth)allyl sulfonate is contained, the content ratio thereof with respect to the total mol number of the polymerization component is, for example, above 0 mol %, or preferably 0.2 mol % or more and, for example, 5 mol % or less, or preferably 3 mol % or less.

These other polymerizable monomers can be used alone or in combination of two or more.

As the other polymerizable monomer, preferably, (meth)acrylamide, an anionic polymerizable monomer, and (meth)allyl sulfonate are used.

To be more specific, preferably, the polymerization component contains the first polymerizable compound, the second polymerizable compound, the (meth)acrylamide, the anionic polymerizable monomer, and the (meth)allyl sulfonate or contains the first polymerizable compound, the second polymerizable compound, the (meth)acrylamide, and the (meth)allyl sulfonate. More preferably, the polymerization component consists of the first polymerizable compound, the second polymerizable compound, the (meth)acrylamide, the anionic polymerizable monomer, and the (meth)allyl sulfonate or consists of the first polymerizable compound, the second polymerizable compound, the (meth)acrylamide, and the (meth)allyl sulfonate.

In view of improvement of the internal bond strength of the paper, preferably, the polymerization component contains the (meth)acrylamide, the anionic polymerizable monomer, and the (meth)allyl sulfonate. That is, preferably, the polymerization component consists of the first polymerizable compound, the second polymerizable compound, the (meth)acrylamide, the anionic polymerizable monomer, and the (meth)allyl sulfonate.

Also, in view of improvement of the water filtering property, preferably, the polymerization component does not contain the anionic polymerizable monomer and contains the (meth)acrylamide and the (meth)allyl sulfonate. That is, preferably, the polymerization component consists of the first polymerizable compound, the second polymerizable compound, the (meth)acrylamide, and the (meth)allyl sulfonate.

In order to copolymerize these polymerization components, for example, the polymerization components, a polymerization initiator, and a solvent are charged in a predetermined reaction vessel to be reacted. In this method, the polymerization components may be collectively charged or may be divisionally charged in a plurality of times. Also, the reaction can be progressed, while a part or all of the polymerization initiator is added dropwise to the reaction vessel.

An example of the polymerization initiator includes a radical polymerization initiator. To be specific, examples thereof include a peroxide compound, sulfides, sulfines, and sulfinic acids. More preferably, a peroxide compound is used. The peroxide compound may be used as a redox polymerization initiator by being used with a reducing agent in combination.

Examples of the peroxide compound include an organic peroxide and an inorganic peroxide. Preferably, an inorganic peroxide is used.

Examples of the organic peroxide include benzoyl peroxide, lauroyl peroxide, acetyl peroxide, caprylyl peroxide, 2,4-dicyclobenzoyl peroxide, isobutyl peroxide, acetyl cyclohexyl sulfonyl peroxide, t-butyl peroxypivalate, t-butylperoxy-2-ethylhexanoate, 1,1-di-t-butylperoxycyclohexane, 1,1-di-t-butylperoxy-3,3,5-trimethylcyclohexane, 1,1-di-t-hexylperoxy-3,3,5-trimethyl cyclohexane, isopropyl peroxydicarbonate, isobutyl peroxydicarbonate, s-butyl peroxydicarbonate, n-butyl peroxydicarbonate, 2-ethylhexyl peroxydicarbonate, bis(4-t-butylcyclohexyl) peroxydicarbonate, t-amylperoxy-2-ethylhexanoate, 1,1,3,3-tetramethylbutylperoxy-ethylhexanoate, 1,1,2-trimethylpropylperoxy-2-ethyl hexanoate, t-butyl peroxy isopropyl monocarbonate, t-amyl peroxy isopropyl monocarbonate, t-butyl peroxy-2-ethylhexyl carbonate, t-butyl peroxy allyl carbonate, t-butyl peroxy isopropyl carbonate, 1,1,3,3-tetramethylbutyl peroxy isopropyl monocarbonate, 1,1,2-trimethylpropyl peroxy isopropyl monocarbonate, 1,1,3,3-tetramethylbutyl peroxy isononate, 1,1,2-trimethylpropyl peroxy isononate, and t-butyl peroxy benzoate.

Examples of the inorganic peroxide include persulfates such as sodium persulfate, potassium persulfate, and ammonium persulfate; hydrogen peroxide; potassium permanganate; bromates such as sodium bromate and potassium bromate; perborates such as sodium perborate, potassium perborate, and ammonium perborate; percarbonates such as sodium percarbonate, potassium percarbonate, and ammonium percarbonate; and perphosphates such as sodium perphosphate, potassium perphosphate, and ammonium perphosphate. Preferably, persulfate is used, more preferably, potassium persulfate and ammonium persulfate are used, or further more preferably, ammonium persulfate is used.

These polymerization initiators can be used alone or in combination of two or more.

As the polymerization initiator, an azo compound can be also used.

Examples of the azo compound include 2,2'-azobisisobutyronitrile, 2,2'-azobis(2-methylpropionamidine), and the salt thereof.

As the polymerization initiator, preferably, an inorganic peroxide is used, more preferably, persulfate is used, or further more preferably, ammonium persulfate is used.

By using the persulfate as the polymerization initiator, that is, by copolymerizing the polymerization component under the presence of the persulfate, the viscosity of the polyacrylamide resin can be retained low, so that papermaking chemicals having excellent handleability can be provided.

The mixing ratio of the polymerization initiator with respect to 100 parts by mass of the total amount of the polymerization component is, for example, 0.01 parts by mass or more, or preferably 0.05 parts by mass or more and, for example, 10 parts by mass or less, or preferably 5 parts by mass or less.

Examples of the solvent include water and solvents mixable with the water such as ketone solvents such as acetone and methyl ethyl ketone; monohydric alcohol solvents such as methanol, ethanol, propanol, isopropanol, and butanol; glycol ether solvents such as ethylene glycol monoethyl ether and propylene glycol monomethyl ether; and ester ether solvents such as propylene glycol monomethyl ether acetate. Preferably, water is used. When tap water is used as the solvent, a chelating agent (ethylenediaminetetraacetic acid or the like) is blended at an appropriate proportion and metal can be removed.

These solvents can be used alone or in combination of two or more.

The mixing ratio of the solvent is not particularly limited and can be appropriately set in accordance with the purpose and intended use.

In this method, along with the polymerization component, the polymerization initiator, and the solvent described above, furthermore, a chain transfer agent (excluding the (meth)allyl sulfonate) can be also appropriately blended.

Examples of the chain transfer agent include isopropyl alcohol and mercaptos (for example, mercapto ethanol, thiourea, thioglycolic acid, mercaptopropionic acid, thiosalicylic acid, thiolactic acid, aminoethanethiol, thioglycerol, thiomalic acid, and the like).

These chain transfer agents can be used alone or in combination of two or more.

The mixing ratio of the chain transfer agent with respect to the total mol number of the polymerization component is, for example, 0.05 mol % or more, or preferably 0.1 mol % or more and, for example, 10 mol % or less, or preferably 5 mol % or less.

The polymerization conditions in the production of the polyacrylamide resin differ in accordance with the kind of the polymerization component, the polymerization initiator, and the solvent, and the polymerization temperature is, for example, 30° C. or more, or preferably 50° C. or more and, for example, 100° C. or less, or preferably 95° C. or less.

The polymerization time is, for example, 0.5 hours or more, or preferably 1 hour or more and, for example, 24 hours or less, or preferably 12 hours or less. The polymerization reaction is terminated by adding a known polymerization terminator (for example, sodium thiosulphate, sodium sulfite, and the like).

The reaction solution at the time of polymerization has a pH of, for example, 1 or more, or preferably 2 or more and, for example, 6 or less, or preferably 5 or less. The pH can be adjusted by adding a known acid such as hydrochloric acid, sulfuric acid, and phosphoric acid.

By the reaction, the first polymerizable compound forms at least one kind of the first unit represented by the above-described formulas (1) to (4) and the second polymerizable compound forms the second unit represented by the above-described formula (5). In this manner, a solution of the polyacrylamide resin can be obtained.

Also, for example, the polyacrylamide resin can be obtained without using the second polymerizable compound.

To be more specific, when the (meth)acrylamide (the (meth)acrylamide that is not modified with the glyoxylic acid) is contained in the polymerization component, the second polymerizable compound (the glyoxylic acid-modified product of the (meth)acrylamide) may not be contained in the polymerization component.

In this case, for example, while the polymerization component containing the (meth)acrylamide (the (meth)acrylamide that is not modified with the glyoxylic acid) is polymerized in the same manner as that described above, the glyoxylic acid and/or the salt thereof are/is added to the polymerization component to be reacted.

In this case, in view of improvement of the internal bond strength of the paper, preferably, the polymerization component contains the (meth)acrylamide, the anionic polymerizable monomer, and the (meth)allyl sulfonate. That is, preferably, the polymerization component consists of the first polymerizable compound, the (meth)acrylamide, the anionic polymerizable monomer, and the (meth)allyl sulfonate.

Also, in view of improvement of the water filtering property, preferably, the polymerization component does not contain the anionic polymerizable monomer and contains the (meth)acrylamide and the (meth)allyl sulfonate. That is, preferably, the polymerization component consists of the first polymerizable compound, the (meth)acrylamide, and the (meth)allyl sulfonate.

As the glyoxylic acid, a known glyoxylic acid can be used. Examples of the salt of the glyoxylic acid include sodium salt, potassium salt, and ammonium salt of the glyoxylic acid.

The addition ratio of the glyoxylic acid and/or the salt thereof is about the same as the content ratio of the second polymerizable compound in the case where the second polymerizable compound is contained in the polymerization component.

To be specific, the addition ratio of the glyoxylic acid and/or the salt thereof with respect to the total mol number of the polymerization component is, for example, above 0 mol %, or preferably 0.1 mol % or more and, for example, 30 mol % or less, or preferably 15 mol % or less.

In this manner, the (meth)acrylamide in the polymerization component can be modified with the glyoxylic acid and the second unit represented by the above-described formula (5) can be formed in the polyacrylamide resin.

Also, for example, the polymerization component containing the (meth)acrylamide (the (meth)acrylamide that is not modified with the glyoxylic acid) is polymerized without adding the glyoxylic acid and/or the salt thereof and thereafter, the glyoxylic acid and/or the salt thereof can be added to a polymer to be obtained to be then reacted.

In this case, the addition ratio of the glyoxylic acid and/or the salt thereof with respect to the total mol number of the polymerization component is, for example, above 0 mol %, or preferably 0.1 mol % or more and, for example, 30 mol % or less, or preferably 15 mol % or less.

The reaction temperature is, for example, 30° C. or more, or preferably 50° C. or more and, for example, 100° C. or less, or preferably 95° C. or less.

The reaction time is, for example, 0.2 hours or more, or preferably 0.5 hours or more and, for example, 5 hours or less, or preferably 2 hours or less.

In this manner, the unit derived from the (meth)acrylamide in the polymer can be modified with the glyoxylic acid, and the second unit represented by the above-described formula (5) can be formed in the polyacrylamide resin.

That is, when the polymerization component does not contain the second polymerizable compound, the polyacrylamide resin containing the first unit represented by the above-described formulas (1) to (4) and the second unit (a constitutional unit derived from the second polymerizable compound) represented by the above-described formula (5) can be also obtained.

In this manner, by obtaining the polyacrylamide resin without using the second polymerizable compound, improvement of the internal bond strength and the water filtering property of the paper can be achieved.

As for the improvement of these functions, the detailed mechanism is unclear and the following is inferred.

That is, the constitutional unit derived from the (meth)acrylamide is a primary constitutional unit in the above-described polymer and is uniformly distributed in the polymer.

Thus, the glyoxylic acid and/or the salt thereof are/is reacted with the (meth)acrylamide that is the polymerization component or the constitutional unit derived from the (meth)acrylamide during or after the above-described polymerization reaction, so that the hydroxy carboxylic acid group derived from the glyoxylic acid is uniformly distributed in the obtained polyacrylamide resin.

In this manner, it is thought that many hydroxy carboxylic acid groups can efficiently act on the pulp, so that the internal bond strength and the water filtering property of the paper are improved.

Among the above-described method, preferably, the polymerization component containing the (meth)acrylamide (the (meth)acrylamide that is not modified with the glyoxylic acid) is polymerized and the glyoxylic acid and/or the salt thereof are/is added to the polymerization component to be then reacted (that is, the (meth)acrylamide that is the polymerization component is modified with the glyoxylic acid and/or the salt thereof during the polymerization reaction).

In the above-described polymerization, preferably, the polymerization component is divisionally charged. To be more specific, first, a part of the polymerization component (for example, 10 to 30 mol % thereof with respect to the total amount of the polymerization component) is charged into the reaction vessel and then, the polymerization initiator is added thereto to be polymerized. Thereafter, the remaining portion of the polymerization component (for example, 70 to 90 mol % thereof with respect to the total amount of the polymerization component) is charged thereto to be polymerized.

In this case, each of the monomers contained in the polymerization component may be contained in either a part or the remaining portion of the polymerization component.

Preferably, the first polymerizable compound is contained in the polymerization component (a part of the polymerization component) that is first charged into the reaction vessel, or more preferably, 50 to 100 mass % of the first polymerizable compound with respect to the total amount of the first polymerizable compound is contained in the polymerization component (a part of the polymerization component) that is first charged into the reaction vessel. The second polymerizable compound may be contained in the polymerization component (a part of the polymerization component) that is first charged into the reaction vessel or may be contained in the remaining portion of the polymerization component.

When the second polymerizable compound (the glyoxylic acid modified product of the (meth)acrylamide) is not contained as the polymerization component, preferably, along with the remaining portion of the polymerization component, the glyoxylic acid and/or the salt thereof are/is added.

In this method, the above-described solvent is added to a solution obtained by the above-described polymerization and the concentration of the solution of the polyacrylamide resin can be also adjusted.

In the solution of the polyacrylamide resin, the concentration thereof is, for example, 10 mass % or more, or preferably 15 mass % or more and, for example, 50 mass % or less, or preferably 45 mass % or less.

The polyacrylamide resin has a weight average molecular weight of, for example, 1000000 or more, preferably 1500000 or more, more preferably 2000000 or more, further more preferably 3500000 or more, or particularly preferably 4500000 or more and, for example, 15000000 or less, preferably 10000000 or less, more preferably 8000000 or less, further more preferably 7500000 or less, or particularly preferably 6000000 or less.

When the weight average molecular weight of the polyacrylamide resin is within the above-described range, in the case where the polyacrylamide resin is used in the production of paper, improvement of the strength of the paper, among all, the internal bond strength of the paper can be achieved and improvement of the water filtering property can be achieved.

The weight average molecular weight of the polyacrylamide resin can be, for example, appropriately adjusted according to the kind, the mixing amount, and the like of the polymerization component.

The measurement method of the weight average molecular weight is in accordance with Examples to be described later.

The polyacrylamide resin has the viscosity (the non-volatile content (solid content) of 20 mass % (at 25° C.)) of, for example, 100 mP·s or more, preferably 1000 mP·s or more, or more preferably 3000 mP·s or more and, for example, 50000 mP·s or less, preferably 20000 mP·s or less, or more preferably 10000 mP·s or less.

The measurement method of the viscosity is in accordance with Examples to be described later.

The polyacrylamide resin thus obtained has at least one kind of the first unit represented by the above-described formulas (1) to (4) and the second unit represented by the above-described formula (5), so that when the polyacrylamide resin is used in the production of paper, improvement of the strength of the paper, among all, the internal bond strength of the paper can be achieved and improvement of the water filtering property can be achieved.

Preferably, the polyacrylamide resin consists of the constitutional unit (the first unit represented by the above-described formulas (1) to (4)) derived from the first polymerizable compound, the constitutional unit (the second unit represented by the above-described formula (5)) derived from the second polymerizable compound, the constitutional unit derived from the (meth)acrylamide, the constitutional unit derived from the anionic polymerizable monomer, and the constitutional unit derived from the (meth)allyl sulfonate or consists of the constitutional unit (the first unit represented by the above-described formulas (1) to (4)) derived from the first polymerizable compound, the constitutional unit (the second unit represented by the above-described formula (5)) derived from the second polymerizable compound, the constitutional unit derived from the (meth)acrylamide, and the constitutional unit derived from the (meth) allyl sulfonate.

Preferably, the polyacrylamide resin consists of the constitutional unit (the first unit represented by the above-described formulas (1) to (4)) derived from the first polymerizable compound, the constitutional unit (the second unit represented by the above-described formula (5)) derived from the second polymerizable compound, the constitutional unit derived from the (meth)acrylamide, the constitutional unit derived from the anionic polymerizable monomer, and the constitutional unit derived from the (meth)allyl sulfonate. According to the polyacrylamide resin, improvement of the internal bond strength of the paper can be further more achieved.

Also, preferably, the polyacrylamide resin consists of the constitutional unit (the first unit represented by the above-described formulas (1) to (4)) derived from the first polymerizable compound, the constitutional unit (the second unit represented by the above-described formula (5)) derived from the second polymerizable compound, the constitutional unit derived from the (meth)acrylamide, and the constitutional unit derived from the (meth)allyl sulfonate. According to the polyacrylamide resin, improvement of the water filtering property can be further more achieved.

Thus, the above-described polyacrylamide resin is preferably used as a papermaking additive of paper used in various industrial fields.

The present invention includes the papermaking additive containing the above-described polyacrylamide resin. To be specific, the papermaking additive of the present invention contains the above-described polyacrylamide resin.

In order to obtain the papermaking additive, for example, the above-described polyacrylamide resin is blended in water and the polyacrylamide resin is dispersed by a known dispersion method.

In a method of dispersing the polyacrylamide resin in the water, for example, the water and the polyacrylamide resin are mixed and dispersed by a known dispersion method such as mechanical dispersion using a dispersion device.

Examples of the dispersion device used in the mechanical dispersion include a known mixer, an ultrasonic homogenizer, and a high-pressure homogenizer. The dispersion conditions are not particularly limited and appropriately set in accordance with the kind of the device.

Also, for example, by synthesizing the polyacrylamide resin in the water, the polyacrylamide resin can be dispersed in the water.

That is, the polyacrylamide resin is synthesized in the water by the above-described method and the obtained aqueous solution of the polyacrylamide resin can be also used as the papermaking additive.

The concentration of the polyacrylamide resin in the papermaking additive is, for example, 10 mass % or more, or preferably 20 mass % or more and, for example, 50 mass % or less, or preferably 45 mass % or less.

The above-described polyacrylamide resin is used in the papermaking additive, so that when the papermaking additive is used in the production of paper, improvement of the strength of the paper, among all, the internal bond strength of the paper can be achieved and improvement of the water filtering property can be achieved.

To be more specific, the above-described papermaking additive is added to a pulp slurry to be subjected to a wet papermaking process, thereby producing paper. The method for wet papermaking is not particularly limited and a known method can be used. The method can be widely used in various papermaking regardless of acid paper with aluminum sulfate as a fixer or neutralized paper with calcium carbonate as a filler. Examples of the paper obtained by the wet papermaking include news print paper, ink jet paper, thermal recording body paper, pressure-sensitive recording body paper, wood free paper, paperboard, coated paper, household paper, and another paper.

The mixing ratio of the papermaking additive (the polyacrylamide resin) and the pulp slurry is not particularly limited. The mixing ratio of the polyacrylamide resin with respect to 100 parts by mass of the pulp slurry is, for example, 0.001 parts by mass or more, or preferably 0.005 parts by mass or more and, for example, 5.0 parts by mass or less, or preferably 2.0 parts by mass or less.

The paper thus obtained contains the polyacrylamide resin of the present invention, so that it can be obtained with excellent productivity and has excellent strength.

EXAMPLES

The present invention will hereinafter be described based on Examples and Comparative Examples. The present invention is however not limited by the following Examples. All designations of "part" or "parts" and "%" mean part or parts by mass and % by mass, respectively, unless otherwise particularly specified. The specific numerical values in mixing ratio (content ratio), property value, and parameter used in the following description will be replaced with upper limits (numerical values defined as "or less" or "below") or lower limits (numerical values defined as "or more" or "above") of corresponding numerical values in mixing ratio (content ratio), property value, and parameter described in the above-described

DESCRIPTION OF EMBODIMENTS

Example 1

As a part of a polymerization component, 15 mol % of the total charged amount of the polymerization component described in Table 1 was prepared and diluted with tap water so that the concentration thereof was 10 mass %.

Next, the obtained solution was charged in a 500-mL separable flask.

Next, sulfuric acid was added to the solution and the pH thereof was adjusted to about 2.5.

Thereafter, while nitrogen was continued being blown into the solution, ammonium persulphate (APS), as a polymerization initiator, was added dropwise at 90° C. to initiate polymerization and next, the remaining portion (85 mol %) of the polymerization component was added dropwise.

After the completion of the dropping of the remaining portion of the above-described polymerization component, the ammonium persulphate (APS), as a polymerization initiator, was added until the appropriate viscosity (about 5000 to 10000 mpa·s) and the reaction was continued around 90° C.

Thereafter, sodium sulfite ($Na_2SO_3$), as a polymerization terminator, and dilution water were added to be cooled, thereby obtaining an aqueous solution of a polyacrylamide resin.

The aqueous solution had the solid content concentration of 20.1 mass %.

Also, the viscosity at 25° C. of the aqueous solution and the weight average molecular weight (Mw) of the polyacrylamide resin were measured by the following method. The results are shown in Table 1.

<Measurement of Viscosity at 25° C.>

The viscosity at 25° C. was measured in accordance with JIS K 7117-1 (in 1999) using a B-type viscometer (rotor No. 3, 12 rpm) (TVB-10 viscometer, manufactured by TOKI SANGYO CO., LTD.).

<Measurement of Weight Average Molecular Weight (Mw) with Gel Permeation Chromatography>

A sample was dissolved in a phosphate buffer having a pH of 7 and the concentration of the sample was adjusted to 1.0 g/L to be measured with gel permeation chromatography (GPC). The weight average molecular weight (Mw) of the sample was calculated from the obtained chromatogram (chart). The measurement device and the measurement conditions are shown below.

Device: part number TDA-302 (manufactured by Viscotek)
Column: part number TSKgel $GMPW_{XL}$ (manufactured by Tosoh Corporation)
Moving Phase: phosphate buffer
Column Flow Rate: 0.8 mL/min
Concentration of Sample: 1.0 g/L
Injection Rate: 500 !lL

Examples 2 to 8 and Comparative Examples 1 to 6

Each of the aqueous solutions of the polyacrylamide resin was obtained in the same manner as that in Example 1 except that the mixing formulation shown in Tables 1 to 2 was used. Also, the viscosity at 25° C. of each of the aqueous solutions and the weight average molecular weight (Mw) of each of the polyacrylamide resins were measured in the same manner as that in Example 1. The results are shown in Tables 1 to 2.

Examples 9 to 10

As a part of the polymerization component, 15 mol % of the total charged amount of the polymerization component described in Table 1 was prepared and diluted with tap water so that the concentration thereof was 10 mass %.

Next, the obtained solution was charged in a 500 -mL separable flask.

Next, the sulfuric acid was added to the solution and the pH thereof was adjusted to about 2.5.

Thereafter, while the nitrogen was continued being blown into the solution, the ammonium persulphate (APS), as the polymerization initiator, was added dropwise at 90° C. to initiate the polymerization and next, a mixed solution of the remaining portion (85 mol %) of the polymerization component and glyoxylic acid that was 3.6 mol % with respect to the polymerization component was added dropwise.

After the completion of the dropping of the remaining portion of the above-described polymerization component, the ammonium persulphate (APS), as the polymerization initiator, was added until the appropriate viscosity (about 5000 to 10000 mPa·s) and the reaction was continued around 90° C.

Thereafter, the sodium sulfite ($Na_2SO_3$), as the polymerization terminator, and the dilution water were added to be cooled, thereby obtaining the aqueous solution of the polyacrylamide resin.

Each of the aqueous solutions had the solid content concentration of 20.5 mass %. Also, the viscosity at 25° C. of each of the aqueous solutions and the weight average molecular weight (Mw) of each of the polyacrylamide resins were measured in the same manner as that in Example 1. The results are shown in Table 1.

Example 11

As a part of the polymerization component, 15 mol % of the total charged amount of the polymerization component described in Table 1 was prepared and diluted with tap water so that the concentration thereof was 10 mass %.

Next, the obtained solution was charged in a 500-mL separable flask.

Next, the sulfuric acid was added to the solution and the pH thereof was adjusted to about 2.5.

Thereafter, while the nitrogen was continued being blown into the solution, the ammonium persulphate (APS), as the polymerization initiator, was added dropwise at 90° C. to initiate polymerization and next, the remaining portion (85 mol %) of the polymerization component was added dropwise.

After the completion of the dropping of the remaining portion of the above-described polymerization component, the ammonium persulphate (APS), as the polymerization initiator, was added until the appropriate viscosity (about 5000 to 10000 mpa·s) and the reaction was continued around 90° C.

Thereafter, the sodium sulfite ($Na_2SO_3$), as the polymerization terminator, and the dilution water were added and next, glyoxylic acid that was 1.8 mol % with respect to the polymerization component was added to continue the reaction at 90° C. for one hour.

Thereafter, the obtained solution was cooled, thereby obtaining an aqueous solution of the polyacrylamide resin.

The aqueous solution had the solid content concentration of 20.9 mass %. Also, the viscosity at 25° C. of the aqueous solution and the weight average molecular weight (Mw) of the polyacrylamide resin were measured in the same manner as that in Example 1. The results are shown in Table 1.

TABLE 1

| | | No. | Ex. 1 | Ex. 2 | Ex. 3 | Ex. 4 | Ex. 5 | Ex. 6 |
|---|---|---|---|---|---|---|---|---|
| Mixing Formulation | Polymerization Component [mol %] | AM | 90.4 | 90.2 | 89.9 | 89.7 | 89.4 | 89.9 |
| | | Acrylic Acid | — | — | — | — | — | — |
| | | Itaconic Acid | — | — | — | — | — | — |
| | | AmGlyA | 3.6 | 3.6 | 3.6 | 3.6 | 3.6 | 3.6 |
| | | DM | — | — | — | — | — | — |
| | | N-methyldiallylamine | — | — | — | — | — | 5.5 |
| | | DADMAC | 5.5 | 5.5 | 5.5 | 5.5 | 5.5 | — |
| | | Sodium Methallylsulfonate | 0.5 | 0.7 | 1.0 | 1.2 | 1.5 | 1.0 |
| | Addition Amount of Glyoxylic Acid [mol %] | | — | — | — | — | — | — |
| Property | | Weight Average Molecular Weight | 1500000 | 4000000 | 4500000 | 6000000 | 7500000 | 4500000 |
| | | Solid Content Concentration (%) | 20.1 | 20.3 | 20.3 | 20.2 | 20.6 | 20.8 |
| | | Viscosity (mPa · s) | 6800 | 7200 | 5800 | 6500 | 7300 | 6400 |
| Evaluation | | Internal Bond [mJ] | 169 | 171 | 186 | 193 | 184 | 179 |
| | | Water Filtering Property | 530 | 540 | 555 | 560 | 555 | 520 |

| | | No. | Ex. 7 | Ex. 8 | Ex. 9 | Ex. 10 | Ex. 11 |
|---|---|---|---|---|---|---|---|
| Mixing Formulation | Polymerization Component [mol %] | AM | 90.2 | 90.2 | 93.5 | 91.7 | 91.7 |
| | | Acrylic Acid | 1.8 | — | — | — | — |
| | | Itaconic Acid | — | 1.8 | — | 1.8 | 1.8 |
| | | AmGlyA | 1.8 | 1.8 | — | — | — |
| | | DM | — | — | — | — | — |
| | | N-methyldiallylamine | — | — | — | — | — |
| | | DADMAC | 5.5 | 5.5 | 5.5 | 5.5 | 5.5 |
| | | Sodium Methallylsulfonate | 0.7 | 0.7 | 1.0 | 1.0 | 1.0 |
| | Addition Amount of Glyoxylic Acid [mol %] | | — | — | 3.6 | 1.8 | 1.8 |
| Property | | Weight Average Molecular Weight | 4500000 | 4500000 | 4500000 | 4500000 | 4500000 |
| | | Solid Content Concentration (%) | 20.4 | 20.5 | 20.5 | 20.7 | 20.9 |
| | | Viscosity (mPa · s) | 6000 | 6900 | 6300 | 5600 | 7100 |
| Evaluation | | Internal Bond [mJ] | 198 | 209 | 195 | 212 | 207 |
| | | Water Filtering Property | 540 | 550 | 560 | 555 | 555 |

TABLE 2

| | | No. | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Mixing Formulation | Polymerization Component [mol %] | AM | 90.6 | 90.4 | 90.5 | 90.3 | 90.2 | 89.9 |
| | | Acrylic Acid | 3.6 | 3.6 | 3.6 | 3.6 | — | — |
| | | Itaconic Acid | — | — | — | — | — | — |
| | | AmGlyA | — | — | — | — | 3.6 | 3.6 |
| | | DM | 5.5 | 5.5 | — | — | 5.5 | 5.5 |
| | | N-methyldiallylamine | — | — | 5.5 | 5.5 | — | — |
| | | DADMAC | — | — | — | — | — | — |
| | | Sodium Methallylsulfonate | 0.3 | 0.5 | 0.4 | 0.6 | 0.7 | 1.0 |
| | Addition Amount of Glyoxylic Acid [mol %] | | | | | | | |

TABLE 2-continued

| No. | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Property | Weight Average Molecular Weight | 2000000 | 4500000 | 2000000 | 4500000 | 2000000 | 4500000 |
| | Solid Content Concentration (%) | 20.4 | 20.7 | 20.9 | 20.5 | 20.8 | 20.9 |
| | Viscosity (mPa · s) | 5200 | 5900 | 6800 | 6200 | 6300 | 7000 |
| Evaluation | Internal Bond [mJ] | 139 | 141 | 144 | 146 | 150 | 150 |
| | Water Filtering Property | 485 | 490 | 480 | 480 | 485 | 495 |

The abbreviations in the Tables are shown below.
AM: acrylamide
DM: dimethylaminoethyl methacrylate
DADMAC: diallyldimethylammonium chloride
AmGlyA: acrylamide-N-glycolic acid <Evaluation>

(1) Internal Bond

By using each of the aqueous solution of the polyacrylamide resin obtained in Examples and Comparative Examples, paper was produced by the following method.

That is, first, a pulp material (bleached kraft pulp (BKP) (hardwood pulp (LBKP)/softwood pulp (NBKP) =50/50, Canadian Standard Freeness (CSF: water filtering property) =380 mL) was added to a 1 L-stainless tube so as to obtain 6.25 g in an absolute dry condition and diluted with tap water so that the concentration of the pulp slurry was 3.0 mass %.

Next, the obtained pulp slurry was stirred at 400 rpm and an aqueous solution of the polyacrylamide resin that was diluted to 1.2 mass % was added thereto one minute after the start of the stirring. The addition amount of the aqueous solution was adjusted so that the solid content thereof was 1.5 mass % with respect to the absolute dry pulp mass.

Two minutes later, the obtained solution was diluted with tap water (pH of 6.5, total hardness of 135 ppm) so that the concentration of the pulp slurry was 1.0 mass %, and three minutes later, the stirring was terminated and papermaking was performed, thereby obtaining wet paper (100 g/m$^2$).

Thereafter, the obtained wet paper was pressed at room temperature and then, dried at 110° C. for three minutes with a drum dryer. In this manner, handmade paper (100 g/m$^2$) was obtained.

By using the obtained paper, the paper strength (internal bond [mJ]) was evaluated by the following method.

That is, in accordance with the standard No. 18-2 "Paper and paperboard-internal bond strength test method-Part 2: Internal Bond Tester method" described in the 2000 edition of JAPAN TAPPI paper pulp test method, the internal bond (IB) of the paper was measured.

The results are shown in Table 1.

(2) Water Filtering Property

The water filtering property in the production step of the paper was evaluated in the following steps.

That is, the pulp slurry to which the above-described aqueous solution of the polyacrylamide resin was added was diluted with tap water in which the pH thereof was adjusted to 7 so that the concentration of the pulp slurry was 0.3%. By using 1000 mL thereof, CSF (ml) was measured in accordance with JIS P 8121-2 (in 2012).

The results are shown in Table 1.

<Consideration>

A presence or absence of the first polymerizable compound and the second polymerizable compound in each of the polymerization components in Comparative Examples 2, 4, and 6 and Example 6 in which the polyacrylamide resin having a weight average molecular weight of 4500000 was produced, and the evaluation results thereof are shown in Table 3.

TABLE 3

| No. | First Polymerizable Compound (N-methyldiallylamine) | Second Polymerizable Compound (AmGlyA) | IB [mJ] | Water Filtering Property |
|---|---|---|---|---|
| Comp. Ex. 2 | Absence | Absence | 141 | 490 |
| Comp. Ex. 4 | Presence | Absence | 146 | 480 |
| Comp. Ex. 6 | Absence | Presence | 150 | 495 |
| Ex. 6 | Presence | Presence | 179 | 520 |
| Comp. Ex. 4-Comp. Ex. 2 | Presence-Absence | Absence-Absence | 5 | −10 |
| Comp. Ex. 6-Comp. Ex. 2 | Absence-Absence | Presence-Absence | 9 | 5 |
| Ex. 6-Comp. Ex. 4 | Presence-Absence | Presence-Absence | 33 | 40 |
| Ex. 6-Comp. Ex. 6 | Presence-Absence | Presence-Absence | 29 | 25 |

As is clear from Table 3, in contrast to Comparative Example 2 in which the polymerization component did not contain both of the first polymerizable compound and the second polymerizable compound, in Comparative Example 4 in which the first polymerizable compound was added to the polymerization component, the value of the internal bond was increased by 5 and the value of the water filtering property was decreased by 10.

Meanwhile, in contrast to Comparative Example 2 in which the polymerization component did not contain both of the first polymerizable compound and the second polymerizable compound, in Comparative Example 6 in which the second polymerizable compound was added to the polymerization component, the value of the internal bond was increased by 9 and the value of the water filtering property was increased by 5.

On the other hand, in contrast to Comparative Example 4 in which the polymerization component contained the first polymerizable compound and did not contain the second polymerizable compound, in Example 6 in which the second polymerizable compound was added to the polymerization component, the value of the internal bond was increased by 33 and the value of the water filtering property was increased by 40.

In contrast to Comparative Example 6 in which the polymerization component contained the second polymerizable compound and did not contain the first polymerizable compound, in Example 6 in which the first polymerizable compound was added to the polymerization component, the value of the internal bond was increased by 29 and the value of the water filtering property was increased by 25.

In this way, a difference between Comparative Example 4 and Example 6 (internal bond of +33, water filtering property of +40) and a difference between Comparative Example 6 and Example 6 (internal bond of +29, water filtering property of +25) are larger than the total value of a difference between Comparative Example 2 and Comparative Example 4 (internal bond of +5, water filtering property of −10) and a difference between Comparative Example 2 and Comparative Example 6 (internal bond of +9, water filtering property of +5).

That is, from the above-described results, the synergistic effect was confirmed in the first polymerizable compound and the second polymerizable compound.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The polyacrylamide resin, the papermaking additive, and the paper of the present invention are preferably used in news print paper, ink jet paper, thermal recording body paper, pressure-sensitive recording body paper, wood free paper, paperboard, coated paper, household paper, and the like.

The invention claimed is:

1. A polyacrylamide resin having at least one kind of a first unit represented by the following formulas (1) to (4) and a second unit represented by the following formula (5),

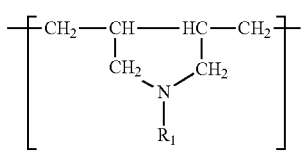 (1)

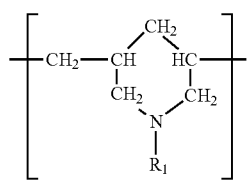 (2)

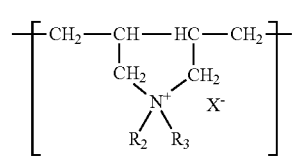 (3)

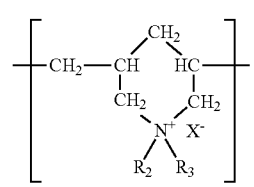 (4)

wherein $R_1$ represents a hydrogen atom, a methyl group, an ethyl group, or a benzyl group; $R_2$ and $R_3$ are independent and represent a hydrogen atom, a methyl group, an ethyl group, or a benzyl group; and X represents an anion,

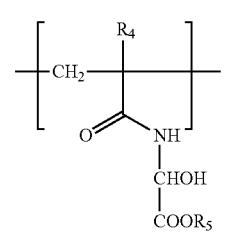 (5)

wherein $R_4$ represents a hydrogen atom or a methyl group and $R_5$ represents a hydrogen atom, an alkali metal ion, or an ammonium ion.

2. The polyacrylamide resin according to claim 1 having the first unit represented by the above-described formula (3) or the above-described formula (4) and having X representing $Cl^-$.

3. A papermaking additive containing:
the polyacrylamide resin according to claim 1.

4. Paper containing:
the polyacrylamide resin according to claim 1.

5. The polyacrylamide resin according to the claim 1 having a weight average molecular weight of 4500000 or more and 7500000 or less.

* * * * *